US011251967B2

(12) United States Patent
Li

(10) Patent No.: US 11,251,967 B2
(45) Date of Patent: Feb. 15, 2022

(54) CONSENSUS METHODS AND SYSTEMS IN CONSORTIUM BLOCKCHAIN

(71) Applicant: ALIPAY (HANGZHOU) INFORMATION TECHNOLOGY CO., LTD., Zhejiang (CN)

(72) Inventor: Shuai Li, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/357,565

(22) Filed: Jun. 24, 2021

(65) Prior Publication Data

US 2021/0344501 A1 Nov. 4, 2021

(30) Foreign Application Priority Data

Jul. 3, 2020 (CN) .......................... 202010629723.3

(51) Int. Cl.
*H04L 9/32* (2006.01)
*H04L 9/30* (2006.01)
*H04L 29/06* (2006.01)

(52) U.S. Cl.
CPC .............. *H04L 9/3239* (2013.01); *H04L 9/30* (2013.01); *H04L 9/3247* (2013.01); *H04L 63/123* (2013.01); *H04L 2209/38* (2013.01)

(58) Field of Classification Search
CPC ....... H04L 9/3239; H04L 9/30; H04L 9/3247; H04L 63/123; H04L 2209/38
See application file for complete search history.

(56) References Cited

U.S. PATENT DOCUMENTS 10,877,829 B2 * 12/2020 Yang ..................... G06F 11/187
11,151,688 B1 * 10/2021 Shuai .................... G06T 7/0002
(Continued)

FOREIGN PATENT DOCUMENTS

| CN | 109379397 A | 2/2019 |
| CN | 109685505 A | 4/2019 |

(Continued)

OTHER PUBLICATIONS

US 10,657,007 B2, 05/2020, Yang (withdrawn)
(Continued)

*Primary Examiner* — Michael R Vaughan
(74) *Attorney, Agent, or Firm* — Fish & Richardson P.C.

(57) ABSTRACT

A consensus method and system in a consortium blockchain is provided. The method includes broadcasting, by a first consensus node, a ViewChange message in a consensus network where the first consensus node does not complete a consensus operation on the target consensus data within a predetermined time period; receiving, by the first consensus primary node, the ViewChange message broadcast by the consensus node; constructing, by the first consensus primary node, a NewView message based on ECHO messages and signatures in N−f verified ViewChange messages, and broadcasting the NewView message to the consensus network to change the consensus network view to a target view; and broadcasting, by a second consensus node, the ECHO message for the target consensus data where the second consensus node determines that the present consensus node has an ECHO message corresponding to the target consensus data.

20 Claims, 2 Drawing Sheets

(56) References Cited

U.S. PATENT DOCUMENTS

| | | | |
|---|---|---|---|
| 2019/0288993 A1* | 9/2019 | Lin | G06Q 20/02 |
| 2019/0377645 A1* | 12/2019 | Abraham | G06F 11/182 |
| 2019/0377648 A1 | 12/2019 | Abraham et al. | |
| 2020/0110648 A1* | 4/2020 | Yang | H04L 9/3247 |
| 2020/0142765 A1 | 5/2020 | Yang | |
| 2020/0145520 A1* | 5/2020 | Yang | G06F 11/0796 |
| 2020/0310901 A1* | 10/2020 | Yang | H04L 9/3247 |
| 2020/0379852 A1* | 12/2020 | Yang | G06F 9/4401 |
| 2021/0018953 A1* | 1/2021 | Ford | G06F 1/14 |
| 2021/0160152 A1* | 5/2021 | Spiegelman | H04L 41/30 |
| 2021/0279255 A1* | 9/2021 | Nayak | G06F 16/2379 |
| 2021/0297251 A1* | 9/2021 | Yang | H04L 9/30 |
| 2021/0314162 A1* | 10/2021 | Li | H04L 9/3236 |
| 2021/0314167 A1* | 10/2021 | Liao | H04L 63/123 |
| 2021/0326352 A1* | 10/2021 | Manevich | G06F 16/23 |

FOREIGN PATENT DOCUMENTS

| | | | |
|---|---|---|---|
| CN | 110535680 A | | 12/2019 |
| CN | 111130879 A | * | 5/2020 |
| CN | 111526219 A | | 8/2020 |
| CN | 111629022 A | * | 9/2020 |
| WO | WO2020042805 | | 3/2020 |

OTHER PUBLICATIONS

Abraham, Ittai, et al. "Brief announcement: Practical synchronous byzantine consensus." 31st International Symposium on Distributed Computing (DISC 2017). Schloss Dagstuhl-Leibniz-Zentrum fuer Informatik, 2017. (Year: 2017).*

Castro, et al., "Practical Byzantine Fault Tolerance," In Proceedings of the Third Symposium on Operating Systems Design and Implementation, Feb. 1999, 14 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Castro et al., "Practical Byzantine Fault Tolerance and Proactive Recovery," ACM Transactions on Computer Systems (TOCS), Nov. 1, 2002, 20(4):398-461.

Extended European Search Report in European Application No. 21181949.5, dated Nov. 12, 2021, 12 pages.

Jiang et al., "High Performance and Scalable Byzantine Fault Tolerance," 2019 IEEE 3rd Information Technology, Networking, Electronic and Automation Control Conference (ITNEC), Mar. 15, 2019, pp. 1195-1202.

* cited by examiner

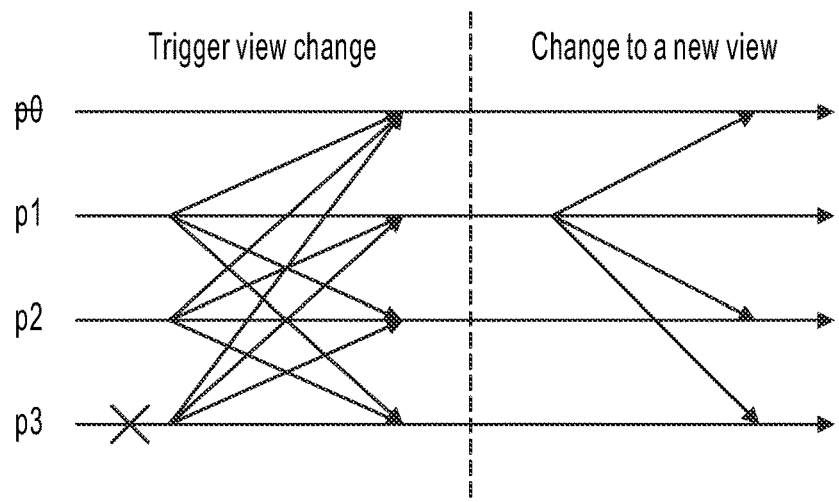

FIG. 1

```
┌─────────────────────────────────────────────────────────────────┐
│ When a first consensus node in a consensus network of a         │
│ consortium blockchain does not complete a consensus operation   │
│ on target consensus data within a predetermined time period,    │──210
│ the first consensus node broadcasts a ViewChange message in     │
│ the consensus network based on received ECHO messages           │
│ broadcast for the target consensus data and received signatures │
└─────────────────────────────────────────────────────────────────┘
                                │
                                ▼
┌─────────────────────────────────────────────────────────────────┐
│ A first consensus primary node in the consensus network         │
│ receives the ViewChange message broadcast by the consensus      │──220
│ node in the consensus network                                   │
└─────────────────────────────────────────────────────────────────┘
                                │
                                ▼
┌─────────────────────────────────────────────────────────────────┐
│ When determining that N−f verified ViewChange messages are      │
│ received, the first consensus primary node constructs a NewView │
│ message based on ECHO messages and signatures in the N−f        │──230
│ verified ViewChange messages, and broadcasts the NewView        │
│ message to the consensus network to change a view of the        │
│ consensus network to a target view                              │
└─────────────────────────────────────────────────────────────────┘
                                │
                                ▼
┌─────────────────────────────────────────────────────────────────┐
│ When a second consensus node that receives the NewView message │
│ determines that a present consensus node has an ECHO message   │──240
│ corresponding to the target consensus data, the second         │
│ consensus node broadcasts the ECHO message for the target      │
│ consensus data in the consensus network                        │
└─────────────────────────────────────────────────────────────────┘
```

FIG. 2

CONSENSUS METHODS AND SYSTEMS IN CONSORTIUM BLOCKCHAIN

CROSS-REFERENCE TO RELATED APPLICATIONS

This application claims priority to Chinese Patent Application No. 202010629723.3, filed on Jul. 3, 2020, which is hereby incorporated by reference in its entirety.

TECHNICAL FIELD

The present specification relates to the field of computer technologies, and in particular, to consensus methods and systems in a consortium blockchain.

BACKGROUND

At present, the practical Byzantine fault tolerance (PBFT) mainly includes two parts: a normal case phase and a view change phase. The normal case phase includes PRE-PREPARE, PREPARE, and COMMIT stages to complete a consensus.

In the PRE-PREPARE stage, a consensus primary node initiates a proposal, and sends a PRE-PREPARE message for the proposal to each consensus backup node. In the PREPARE stage, each consensus backup node verifies a received PRE-PREPARE message, and after the verification succeeds, sends a PREPARE message to other consensus backup nodes and the consensus primary node. In the COMMIT stage, a consensus backup node or the consensus primary node receives one PRE-PREPARE message and PREPARE messages from not less than 2f consensus nodes, and sends a COMMIT message to other consensus nodes in the consortium blockchain if the verification succeeds.

However, if a consensus operation for the target proposal is not completed within a predetermined time period, the consensus node in the consensus network can trigger a view change operation to attempt to replace the consensus primary node. In addition, in the process, consensus nodes other than the consensus primary node do not receive the PRE-PREPARE message that can be used to recover the original target proposal, where a failure already occurs in the primary node, the other consensus nodes cannot recover the original target proposal. Consequently, the consensus operation on the target proposal cannot continue after view change.

SUMMARY

Embodiments of the present specification provide consensus methods and systems in a consortium blockchain to deal with a problem that, after a view change operation is performed in a round of consensus operation based on an existing PBFT consensus algorithm, continue to perform consensus of data that hasn't yet reached consensus can't be ensured.

To deal with the previous technical problem, some embodiments of the present specification are implemented as described below:

According to a first aspect, a consensus method in a consortium blockchain is provided, including:

When a first consensus node in a consensus network of the consortium blockchain does not complete a consensus operation on target consensus data within a predetermined time period, the first consensus node broadcasts a ViewChange message in the consensus network based on received ECHO messages broadcast for the target consensus data and received signatures, where the ECHO messages broadcast for the target consensus data and the signatures are sent by other consensus nodes in the consensus network.

The first consensus primary node in the consensus network receives the ViewChange message broadcast by a consensus node in the consensus network, where the first consensus primary node is a consensus primary node corresponding to a view existing when the consensus operation is performed on the target consensus data.

When the first consensus primary node determines that N−f verified ViewChange messages are received, the first consensus primary node constructs a NewView message based on ECHO messages and signatures in the N−f verified ViewChange messages, and broadcasts the constructed NewView message to the consensus network to change the view of the consensus network to a target view, where f is a maximum quantity of abnormal consensus nodes allowed in the consensus network, N is a quantity of consensus nodes in the consensus network, and N≥3f+1.

When a second consensus node that receives the Newview message determines that the present consensus node has an ECHO message corresponding to the target consensus data, the second consensus node broadcasts the ECHO message for the target consensus data in the consensus network, where a view number in the ECHO message is a view number of the target view.

According to a second aspect, a system in a consortium blockchain is provided, including: a first consensus node, configured to: when the first consensus node does not complete a consensus operation on target consensus data within a predetermined time period, broadcast a ViewChange message in a consensus network based on ECHO messages broadcast for target consensus data and signatures that are received from other consensus nodes in the consensus network of the consortium blockchain; a consensus primary node, configured to receive the ViewChange message broadcast by the consensus node in the consensus network; and construct a NewView message based on ECHO messages and signatures in N−f verified ViewChange messages when the consensus primary node determines that the N−f verified ViewChange messages are received, and broadcast the constructed NewView message to the consensus network to change a view of the consensus network to a target view, where f is a maximum quantity of abnormal consensus nodes allowed in the consensus network, N is a quantity of consensus nodes in the consensus network, and N≥3f+1; and a second consensus node, configured to broadcast the ECHO message for the target consensus data in the consensus network when the second consensus node that receives the NewView message determines that the present consensus node has an ECHO message corresponding to the target consensus data, where a view number in the ECHO message is a view number of the target view.

The embodiments of the present specification can achieve at least the following technical effects by using the previous technical solutions:

In the consensus method provided in the embodiments of the present specification, when the first consensus node in the consensus network of the consortium blockchain does not complete the consensus operation on the target consensus data within the predetermined time period, the first consensus node can broadcast the ViewChange message in the consensus network based on the ECHO messages broadcast for the target consensus data and the signatures that are sent by other consensus nodes in the consortium blockchain.

The first consensus primary node in the consensus network receives the ViewChange message broadcast by the consensus node in the consensus network. When the first consensus primary node determines that the N−f verified ViewChange messages are received, the first consensus primary node constructs the NewView message based on the ECHO messages and the signatures in the N−f verified ViewChange messages, and broadcasts the constructed NewView message to the consensus network. When the second consensus node that receives the NewView message determines that the present consensus node has the ECHO message corresponding to the target consensus data, the second consensus node can broadcast the ECHO message for the target consensus data in the consensus network.

In other words, after a consensus node in the consensus network triggers a view change operation, any consensus node in the consensus network, i.e. the first consensus node, can broadcast the ViewChange message in the consensus network, and the ViewChange message includes the ECHO messages broadcast by the consensus nodes in the consortium blockchain for the target consensus data and the corresponding signatures that are received by the first consensus node. As such, even if the consensus node triggering the view change is not a consensus primary node after the view change, an ECHO message constructed by the consensus node in the consensus network for the target consensus data and a corresponding signature can still be obtained by other consensus nodes in the consensus network, so that the consensus node in the consensus network continues to perform the consensus operation on the target consensus data in the consensus network after the view change.

BRIEF DESCRIPTION OF DRAWINGS

The accompanying drawings described here are used to provide further understanding of the present specification, and constitute a part of the present specification. The example embodiments of the present specification and descriptions thereof are used to explain the present specification, and are not intended to constitute an undue limitation of the present specification. In the accompanying drawings:

FIG. 1 is a schematic flowchart illustrating view change in existing PBFT;

FIG. 2 is a schematic flowchart illustrating implementation of a consensus method in a consortium blockchain, according to some embodiments of the present specification;

DESCRIPTION OF EMBODIMENTS

Figure 3:
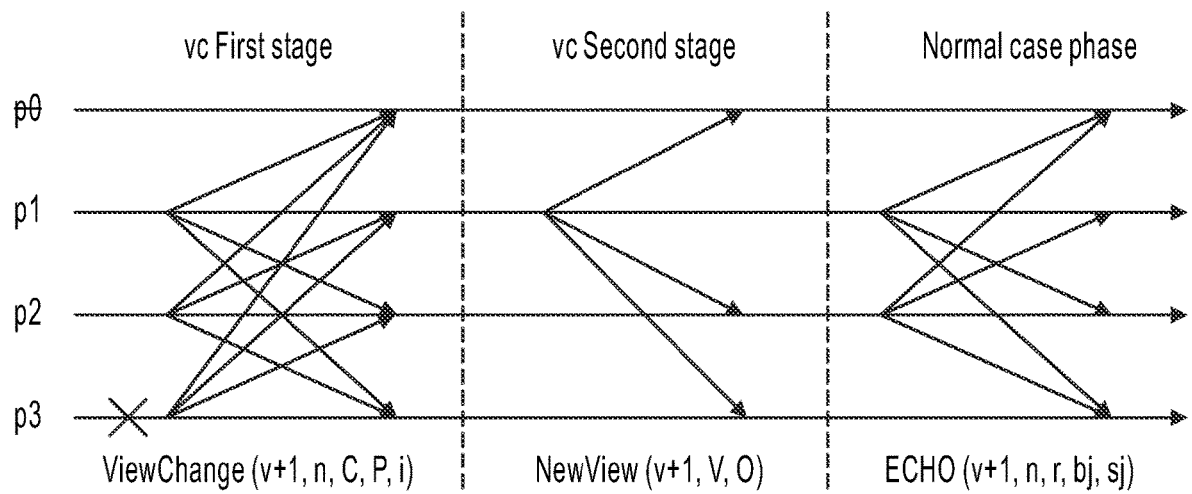
FIG. 3 is a schematic diagram illustrating an actual scenario to which a consensus method in a consortium blockchain is applied, according to some embodiments of the present specification.

To make the objectives, technical solutions, and advantages of the present specification clearer, the following clearly and comprehensively describes the technical solutions of the present specification with reference to specific embodiments and accompanying drawings of the present specification. Clearly, the described embodiments are merely some but not all of the embodiments of the present specification. All other embodiments obtained by a person of ordinary skill in the art based on the embodiments of the present specification without creative efforts shall fall within the protection scope of the present specification.

The technical solutions provided in some embodiments of the present specification are described in detail below with reference to the accompanying drawings.

FIG. 1 is a schematic flowchart illustrating view change in existing PBFT algorithm. A consensus network shown in FIG. 1 includes four consensus nodes p0, p1, p2, and p3. p0 is a consensus primary node before the view change, and p3 is an abnormal consensus node in the consensus network.

In FIG. 1, if consensus primary node p0 works maliciously, consensus primary node p0 may assign a same sequence number to different requests, or does not assign a sequence number, or makes adjacent sequence numbers discontinuous. Consensus backup nodes (p1 to p3) in the consensus network should be responsible to proactively check validity of these sequence numbers. A view change in the consensus network can be triggered if consensus primary node p0 is offline or works maliciously and does not broadcast a request of a client device, then a consensus on data requested by the client device is not completed within a predetermined time period, i.e. a consensus backup node (any one of consensus node p1 to consensus node p3) detects that consensus primary node (p0) is offline or works maliciously due to timeout. A specific process can include the following.

The consensus backup node broadcasts a ViewChange message in the format of a message <VIEW-CHANGE, v+1, n, C, P, i> to other consensus nodes, where n is a newest stable checkpoint number, i.e. a block number corresponding to data on which a consensus operation is performed currently, C is a set of 2f+1 verified CheckPoint messages, and P is a set of requested PRE-PREPARE and PREPARE messages that are currently not completed by the consensus backup node.

When a new consensus primary node p=v+1 mod |R| receives 2f valid ViewChange messages after the view change, the new consensus primary node can broadcast a message <NEW-VIEW, v+1, V, O> to the other consensus nodes, where V is a set of valid ViewChange messages, and O is a set of uncompleted PRE-PREPARE messages that are re-initiated by the consensus primary node. A selection rule of a set of PRE-PREPARE messages is as follows:

1. A minimum stable checkpoint number min-s in V and a maximum number max-s of a prepare message in V are selected.

2. For min-s and max-s, if message set P exists, a message <<PRE-PREPARE, v+1, n, d>, m> is created. Otherwise, an empty PRE-PREPARE message is created, i.e. <<PRE-PREPARE, v+1, n, d (null)>, m (null)>, m (null) is a null message, and d (null) is a null message digest.

When receiving a NewView message of the new consensus primary node after the view change, the consensus backup node verifies the validity, and when the verification succeeds, enters a new view state after the view change, i.e. the new view state with a view number v+1, and starts processing the PRE-PREPARE message in O.

In the consensus method provided in the embodiments of the present specification, when the first consensus node in the consensus network of the consortium blockchain does not complete the consensus operation on the target consensus data within the predetermined time period, the first consensus node can broadcast the ViewChange message in the consensus network based on the ECHO messages broadcast for the target consensus data and the signatures that are sent by other consensus nodes in the consortium blockchain. A first consensus primary node in the consensus network receives the ViewChange message broadcast by a consensus node in the consensus network. When the first consensus primary node determines that the N−f verified ViewChange messages are received, the first consensus primary node constructs the NewView message based on the ECHO messages and the signatures in the N−f verified ViewChange messages, and broadcasts the constructed NewView message to the consensus network. When the second consensus node that receives the NewView message determines that the present consensus node has the ECHO message corresponding to the target consensus data, the second consensus node can broadcast the ECHO message for the target consensus data in the consensus network.

In other words, after a consensus node in the consensus network triggers a view change operation, any consensus node in the consensus network, i.e. the first consensus node, can broadcast the ViewChange message in the consensus network, and the ViewChange message includes the ECHO messages broadcast by the consensus nodes in the consortium blockchain for the target consensus data and the corresponding signatures that are received by the first consensus node. As such, even if the consensus node triggering the view change is not a consensus primary node after the view change, an ECHO message constructed by the consensus node in the consensus network for the target consensus data and a corresponding signature can still be obtained by other consensus nodes in the consensus network, so that the consensus node in the consensus network continues to perform the consensus operation on the target consensus data in the consensus network after the view change.

Specifically, FIG. 2 is a schematic flowchart illustrating implementation of a consensus method in a consortium blockchain, according to one or more embodiments of the present specification. The method includes the following.

Step 210. When a first consensus node in a consensus network of the consortium blockchain does not complete a consensus operation on target consensus data within a predetermined time period, the first consensus node broadcasts a ViewChange message in the consensus network based on received ECHO messages broadcast for the target consensus data and received signatures, where the ECHO messages broadcast for the target consensus data and the signatures are sent by other consensus nodes in the consensus network.

The format of the ViewChange message is ViewChange (v+1, n, C, P, i), where v+1 is a view number after view change, n is a block number corresponding to the target consensus data, C is a set of N−f verified CheckPoint messages, P is prepared data and includes N−f ECHO messages with valid signatures, and the N−f ECHO messages with the valid signatures are constructed by N−f consensus nodes in the consensus network based on received VAL messages. N is a positive integer greater than or equal to 3f+1, f is a maximum quantity of abnormal consensus nodes allowed in the consensus network, and when a state of the consensus node is changed to a prepared state, it indicates that the consensus node has received the N−f ECHO messages with the valid signatures.

The first consensus node can be any consensus node in the consensus network, that is, the first consensus node can be any consensus backup node in the consortium blockchain, or a first consensus primary node, or a second consensus primary node. That is, any consensus node in the consensus network including the consensus primary node or the consensus backup node can trigger a view change operation in the consensus network when the consensus node does not complete the consensus operation on the target consensus data within the predetermined time period, to attempt to replace the consensus primary node in the consensus network.

It can be understood that the ViewChange message can include the ECHO messages broadcast by all consensus nodes in the consensus network for the target consensus data and the corresponding signatures that are received by the first consensus node. Specifically, the ECHO message can be constructed by the consensus node in the consensus network for the received VAL message in the normal case phase of a PBFT consensus algorithm. The ECHO message can include the block number corresponding to the target consensus data, current view number of the target consensus data, and original target consensus data. Specifically, the signature of the ECHO message can be a signature of the ECHO message that is obtained by each consensus node in the consensus network by using a private key of the consensus node.

When the target consensus data can be split, based on a specified erasure coding technology, into a plurality of data fragments that have a same quantity as the consensus nodes in the consensus network, the plurality of data fragments can be sent to corresponding consensus nodes in the consensus network by using VAL messages. Data fragments in the VAL messages received by the consensus nodes are different, and one data fragment corresponds to one consensus node in the consensus network. In this case, the ECHO message broadcast by the consensus node in the consensus network can specifically include the block number corresponding to the target consensus data, the number of the view showing the target consensus data currently, a data fragment corresponding to the consensus node, a Merkle tree path of the data fragment in a Merkle tree constructed by using the plurality of data fragments, and a root hash of the Merkle tree constructed by using the plurality of data fragments.

Optionally, to reduce network transmission bandwidth consumed by the consensus primary node in the consensus operation process, the target consensus data in some embodiments of the present specification can be split into the plurality of data fragments based on the specified erasure coding technology. Specifically, before the first consensus node broadcasts the ViewChange message in the consensus network, the method provided in some embodiments of the present specification further includes the following.

The second consensus primary node in the consensus network splits, based on the specified erasure coding technology, the target consensus data into the plurality of orderly arranged data fragments that have the same quantity as the consensus nodes in the consensus network, where the second consensus primary node is a consensus primary node corresponding to a previous view of a view corresponding to the first consensus primary node.

The consensus primary node constructs the Merkle tree based on the plurality of orderly arranged data fragments.

The second consensus primary node locally saves a data fragment corresponding to the second consensus primary node, a corresponding Merkle tree path, and the root hash of the Merkle tree, and sends, to corresponding consensus nodes in the consensus network, VAL messages including other data fragments, corresponding Merkle tree paths, and the root hash of the Merkle tree, where one data fragment corresponds to one consensus node in the consensus network.

The Merkle tree path corresponding to the data fragment corresponding to the second consensus primary node is a hash value associated with the data fragment corresponding to the second consensus primary node in the Merkle tree.

Assume that the quantity of the consensus nodes in the consensus network is 4, before the view change, the consensus network includes the second consensus primary node (consensus node 0) and the consensus backup nodes (consensus node 1 to consensus node 3), where consensus node 3 is abnormal, namely, an abnormal consensus node in the consensus network. Specifically, the second consensus primary node can split the target consensus data into four data fragments (s0 to s3) after processing the target consensus data by using the specified erasure coding algorithm, and the consensus primary node constructs the Merkle tree based on hash values of the split four data fragments (s0 to s3). The hash value of s0 is hash000, the hash value of s1 is hash001, the hash value of s2 is hash002, the hash value of s3 is hash003, hash (hash00, hash01)=hash00, hash (hash002, hash003)=hash01, and hash (hash01, hash02)=hash0, namely, the root hash of the Merkle tree.

The consensus primary node locally saves a VAL message including s0, hash value b0 (hash001, hash01) of s0 on the hash path on the Merkle tree, and the root hash hash0 of the Merkle tree, constructs VAL messages based on other data fragments, corresponding Merkle tree paths, and the root hash of the Merkle tree, and sends the VAL messages to consensus nodes corresponding to the data fragment in the VAL messages. Specifically, the consensus primary node can send a first VAL message including (s1 and Hash000, Hash01, Hash0) to consensus node 1, send a second VAL message including (s2 and Hash030, Hash00, Hash0) to consensus node 2, and send a third VAL message including (s3 and Hash020, Hash00, Hash0) to consensus node 3.

Optionally, after the second consensus primary node locally saves the data fragment corresponding to the second consensus primary node, the corresponding Merkle tree path, and the root hash of the Merkle tree, and sends, to the corresponding consensus nodes in the consensus network, the VAL messages including other data fragments, the corresponding Merkle tree paths, and the root hash of the Merkle tree, the method provided in some embodiments of the present specification further includes the following.

A third consensus node receiving a VAL message constructs an ECHO message for the received VAL message, and broadcasts the constructed ECHO message to the consensus network, where the constructed ECHO message includes a data fragment, a corresponding Merkle tree path, and the root hash of the Merkle tree in the received VAL message.

The second consensus primary node constructs an ECHO message based on the locally saved data fragment, corresponding Merkle tree path, and root hash of the Merkle tree, and broadcasts the constructed ECHO message to the consensus network.

The third consensus node can be any consensus backup node in the consensus network other than the second consensus primary node.

In some embodiments of the present specification, the message broadcast by the consensus node in the PREPARE stage in the PBFT algorithm is changed to the ECHO message, and the format of the ECHO message is <<ECHO, v, n, r>, bj, sj>. When the consensus node (including the consensus primary node) in the consensus network receives the VAL message; verifies whether the root hash of the Merkle tree in the VAL data is correct; and if no, discards the message; or if yes, the ECHO message is constructed and broadcast based on the received VAL message and the signature obtained by each consensus node by signing the ECHO message by using the private key.

After the consensus node in the consensus network receives N−2f correct ECHO messages, the state of the consensus node can be updated to the VAL complete state. If the consensus node in the consensus network does not receive the VAL message, but receives the N−2f correct ECHO messages sent by the other consensus nodes, the consensus node can obtain the plurality of data fragments and the corresponding Merkle tree by parsing the original target consensus data obtained by parsing the N−2f correct ECHO message sent by the other consensus nodes, construct an ECHO message corresponding to the consensus node based on data fragments corresponding to the present consensus node in the plurality of data fragments, corresponding Merkle tree paths, and the root hash of the Merkle tree, and broadcast the ECHO message and a corresponding signature in the consensus network.

As shown in FIG. 3, FIG. 3 is a schematic diagram illustrating an actual scenario to which a consensus method in a consortium blockchain is applied, according to some embodiments of the present specification. The consensus network shown in the FIG. 3 includes four consensus nodes, that is N=4, that is, the second consensus primary node (p0) and the consensus backup nodes (p1 to p3), where p3 is in the abnormal state before view change, and recovers to a normal state after view change.

In the first stage of the view change vc shown in FIG. 3, when the consensus network does not complete the consensus operation on the target consensus data within the predetermined time period, the first consensus node (any one of consensus nodes p1 to p3) in the consensus network can broadcast the ViewChange message in the consensus network. The format of the ViewChange message is ViewChange (v+1, n, C, P, i).

Step 220. The first consensus primary node in the consensus network receives the ViewChange message broadcast by the consensus node in the consensus network.

The first consensus primary node is a consensus primary node corresponding to a view existing when the consensus operation is performed on the target consensus data, i.e., an updated consensus primary node in the consensus network after the view change. The consensus primary node can be determined by using a formula p=v mode N, where v is the view number after the view change and N is the quantity of the consensus nodes in the consensus network.

Step 230. The first consensus primary node constructs a NewView message based on ECHO messages and signatures in N−f verified ViewChange messages when the first consensus primary node determines that the N−f verified ViewChange messages are received, and broadcasts the NewView message to the consensus network to change a view of the consensus network to a target view, where f is a maximum quantity of abnormal consensus nodes allowed in the consensus network, N is a quantity of the consensus nodes in the consensus network, and N≥3f+1.

The target view is the next view v+1 of the current view v of the consensus network.

After receiving N−f valid ViewChange messages about changing to the view with the view number v+1, the new consensus primary node after the view change, i.e. the first consensus primary node can calculate the NewView message, i.e. content of the NewView message based on the N−f ECHO messages included in the ViewChange message, and add all valid P to O, where the format of 0 is <v+1, n, r>, r is the root hash of the Merkle tree constructed by using the plurality of data fragments obtained by splitting the target consensus data, and n is the block number corresponding to the target consensus data. Specifically, when the ViewChange message has a valid P, it indicates that N−f consensus nodes in the consensus network receive the same target consensus data, that is, at least N−2f loyal consensus nodes have a plurality of data fragments corresponding to the target consensus data.

It can be understood that when the ECHO message broadcast by each consensus node further includes the signature of each consensus node, the legitimacy of the ECHO message can be determined directly based on the signature. Specifically, the step that the first consensus primary node constructs a NewView message based on ECHO messages and signatures in N−f verified ViewChange messages when the first consensus primary node determines that the N−f verified ViewChange messages are received includes the following.

The first consensus primary node determines whether a hash value of an ECHO message in each of the received ViewChange messages is consistent with data obtained by decrypting a signature corresponding to the ECHO message by using the public key.

When the hash values of N−f ECHO messages in the ECHO messages in the received ViewChange messages are consistent with data obtained by decrypting signatures corresponding to the ECHO messages, the first consensus primary node determines that the N−f verified ViewChange messages are received.

The first consensus primary node constructs the NewView message based on the ECHO messages and the signatures in the N−f verified ViewChange messages.

It should be understood that when N data fragments are obtained by splitting the target consensus data by using the specified erasure coding technology, the node need to receive at least N−2f data fragments to recover the original target consensus data. Because P includes N−f Echo messages and signatures, at least N−2f loyal nodes in the system have erasure coding fragments of the target consensus data. Specifically, the step that the first consensus primary node constructs a NewView message based on ECHO messages and signatures in N−f verified ViewChange messages includes the following.

The first consensus primary node obtains corresponding N−f data fragments based on the ECHO messages and the signatures in the N−f verified ViewChange messages, and the first consensus primary node constructs the Merkle tree based on the N−f data fragments, and obtains the root hash of the Merkle tree.

The first consensus primary node constructs the NewView message based on the root hash of the Merkle tree, the N−f verified ViewChange messages, and the block number corresponding to the target consensus data.

In the previous example in FIG. 3, in the second stage of the view change vc shown in FIG. 3, when determining that the N−f verified ViewChange messages including the ECHO messages and the corresponding signatures are received, first consensus primary node p1 can construct the NewView message in the format of NewView (v+1, V, O) based on the N−f verified ViewChange messages, and broadcast the NewView message to the consensus network, where V is the N−f ViewChange messages, and O is (v+1, n, r) obtained through calculation.

Step 240. The second consensus node broadcasts the ECHO message for the target consensus data in the consensus network when the second consensus node that receives the NewView message determines that the present consensus node has an ECHO message corresponding to the target consensus data, where a view number in the ECHO message is a view number of the target view.

The second consensus node can be any consensus backup node in the consensus network, and the first consensus node and the second consensus node can be the same node or different nodes.

The format of the ECHO message for the target consensus data is ECHO (v+1, n, r, bj, sj), where sj is a target data fragment corresponding to the consensus node in the target consensus data, bj is a Merkle tree path of the target data fragment in the Merkle tree, and r is the root hash of the Merkle tree.

Optionally, the step that the second consensus node broadcasts the ECHO message for the target consensus data in the consensus network when the second consensus node that receives the NewView message determines that the present consensus node has an ECHO message corresponding to the target consensus data includes the following.

The second consensus node broadcasts the ECHO message for the target consensus data in the consensus network when the second consensus node that receives the NewView message determines that the present consensus node has an ECHO message including the root hash of the Merkle tree.

Optionally, the step that the second consensus node broadcasts the ECHO message for the target consensus data in the consensus network when the second consensus node that receives the NewView message determines that the present consensus node has an ECHO message corresponding to the target consensus data includes the following.

When the second consensus node that receives the NewView message determines that the present consensus node has the ECHO message corresponding to the target consensus data, the second consensus node constructs the ECHO message for the target consensus data based on a target data fragment in the ECHO message corresponding to the target consensus data in the present consensus node, a Merkle tree path of the target data fragment in the Merkle tree, the root hash of the Merkle tree, a view number obtained after view change, and the block number corresponding to the target consensus data.

The second consensus node that receives the NewView message broadcasts the ECHO message for the target consensus data in the consensus network after the view change.

As shown in FIG. 3, after the first stage and the second stage of the view change vc are completed, the consensus network enters the normal case phase again. In this case, the second consensus node that receives the NewView message includes the first consensus primary node. When determining that the present consensus node has the ECHO message corresponding to the target consensus data, i.e. the present consensus node has the target data fragment corresponding to the present consensus node, the second consensus node can construct the ECHO message, namely, ECHO (v+1, n, r, bj, sj), for the target consensus data based on the target data fragment in the ECHO message corresponding to the target consensus data in the present consensus node, the Merkle tree path of the target data fragment in the Merkle tree, the root hash of the Merkle tree, the view number obtained after the view change, and the block number corresponding to the target consensus data, where sj is the target data fragment, bj is the Merkle tree path of the target data fragment in the Merkle tree, and r is the root hash of the Merkle tree. In FIG. 3, consensus node p3 is the abnormal consensus node in the previous round of consensus operation, but recovers to the normal state after the view change operation, and p0 is again in a failure state after the view change. Therefore, only consensus nodes p1 and p2 have corresponding data fragments in the target consensus data.

It should be understood that after the second consensus node that receives the NewView message broadcasts the ECHO message for the target consensus data in the consensus network after the view change, the subsequent consensus operation process is unchanged, that is, the method provided in some embodiments of the present specification further includes the following.

A fourth consensus node that receives the ECHO message for the target consensus data of the N–f consensus nodes commits the target consensus data to a state machine if the fourth consensus node receives ECHO messages of N–f consensus nodes for the target consensus data.

The fourth consensus node can be any consensus node in the consensus network.

In the consensus method provided in the embodiments of the present specification, when the first consensus node in the consensus network of the consortium blockchain does not complete the consensus operation on the target consensus data within the predetermined time period, the first consensus node can broadcast the ViewChange message in the consensus network based on the ECHO messages broadcast for the target consensus data and the signatures that are sent by other consensus nodes in the consortium blockchain. The first consensus primary node in the consensus network receives the ViewChange message broadcast by a consensus node in the consensus network. When the first consensus primary node determines that the N–f verified ViewChange messages are received, the first consensus primary node constructs the NewView message based on the ECHO messages and the signatures in the N–f verified ViewChange messages, and broadcasts the constructed NewView message to the consensus network. When the second consensus node that receives the NewView message determines that the present consensus node has the ECHO message corresponding to the target consensus data, the second consensus node can broadcast the ECHO message for the target consensus data in the consensus network.

In other words, after a consensus node in the consensus network triggers a view change operation, any consensus node in the consensus network, i.e. the first consensus node, can broadcast the ViewChange message in the consensus network, and the ViewChange message includes the ECHO messages broadcast by the consensus nodes in the consortium blockchain for the target consensus data and the corresponding signatures that are received by the first consensus node. As such, even if the consensus node triggering the view change is not a consensus primary node after the view change, an ECHO message constructed by the consensus node in the consensus network for the target consensus data and a corresponding signature can still be obtained by other consensus nodes in the consensus network, so that the consensus node in the consensus network continues to perform the consensus operation on the target consensus data in the consensus network after the view change.

Figure 4:
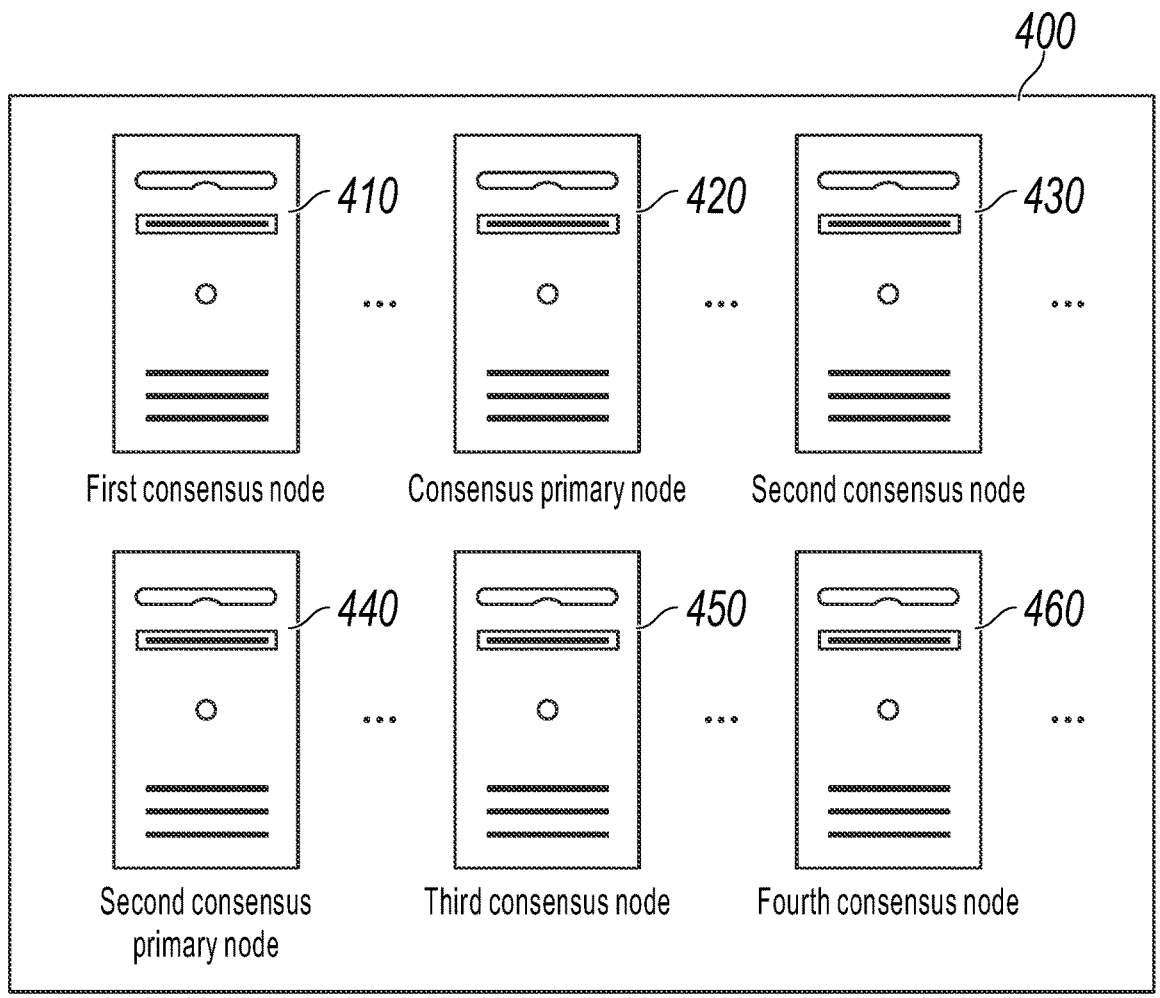
FIG. 4 is a schematic structural diagram illustrating a system in a consortium blockchain, according to some embodiments of the present specification.

FIG. 4 is a schematic structural diagram illustrating a system 400 in a consortium blockchain, according to some embodiments of the present specification. Referring to FIG. 4, in some software implementations, the system 400 in a consortium blockchain can include a first consensus node 410, a consensus primary node 420, and a second consensus node 430.

The first consensus node 410 is configured to: when the first consensus node does not complete a consensus operation on target consensus data within a predetermined time period, broadcast a ViewChange message in a consensus network based on ECHO messages broadcast for target consensus data and signatures that are received from other consensus nodes in the consensus network of the consortium blockchain.

The consensus primary node 420 is configured to receive the ViewChange message broadcast by a consensus node in the consensus network; and construct a NewView message based on ECHO messages and signatures in N–f verified ViewChange messages when the consensus primary node determines that the N–f verified ViewChange messages are received, and broadcast the constructed NewView message to the consensus network to change a view of the consensus network to a target view, where f is a maximum quantity of abnormal consensus nodes allowed in the consensus network, N is a quantity of consensus nodes in the consensus network, and N≥3f+1.

The second consensus node 430 is configured to broadcast the ECHO message for the target consensus data in the consensus network when the second consensus node that receives the NewView message determines that the present consensus node has an ECHO message corresponding to the target consensus data, where a view number in the ECHO message is a view number of the target view.

Based on the system in a consortium blockchain provided in some embodiments of the present specification, the following can be understood:

After a consensus node in the consensus network triggers a view change operation, any consensus node in the consensus network, i.e. the first consensus node, can broadcast the ViewChange message in the consensus network, and the ViewChange message includes the ECHO messages broadcast by the consensus node in the consortium blockchain for the target consensus data and the corresponding signature that are received by the first consensus node. As such, even if the consensus node triggering the view change is not the consensus primary node after the view change, an ECHO message constructed by the consensus node in the consensus network for the target consensus data and a corresponding signature can still be obtained by other consensus nodes in the consensus network, so that the consensus node in the consensus network continues to perform the consensus operation on the target consensus data in the consensus network after the view change.

Optionally, in some embodiments, before the first consensus node 410 broadcasts the ViewChange message in the consensus network, the system includes a second consensus primary node 440, configured to split the target consensus data into a plurality of orderly arranged data fragments that have a same quantity as the consensus nodes in the consensus network, where the second consensus primary node is a consensus primary node corresponding to a previous view of a view corresponding to the first consensus primary node; construct the Merkle tree based on the plurality of orderly arranged data fragments; and locally save a data fragment corresponding to the second consensus primary node, a corresponding Merkle tree path, and a root hash of the Merkle tree, and send, to corresponding consensus nodes in the consensus network, VAL messages including other data fragments, corresponding Merkle tree paths, and the root hash of the Merkle tree, where one data fragment corresponds to one consensus node in the consensus network.

Optionally, in some embodiments, after the second consensus primary node 440 locally saves the data fragment corresponding to the second consensus primary node, the corresponding Merkle tree path, and the root hash of the Merkle tree, and sends, to the corresponding consensus nodes, the VAL messages including other data fragments, the corresponding Merkle tree paths, and the root hash of the Merkle tree in the consensus network, a third consensus node 450 in the system in a consortium blockchain constructs an ECHO message for the received VAL message, and broadcasts the constructed ECHO message to the consensus network, where the constructed ECHO message includes a data fragment, a corresponding Merkle tree path, and the root hash of the Merkle tree in the received VAL message; and the second consensus primary node 440 constructs an ECHO message based on the locally saved data fragment, corresponding Merkle tree path, and root hash of the Merkle tree, and broadcasts the constructed ECHO message to the consensus network.

Optionally, in some embodiments, the consensus primary node 420 is configured to determine whether a hash value of an ECHO message in each of the received ViewChange messages is consistent with data obtained by decrypting a signature corresponding to the ECHO message by using a public key; when hash values of N−f ECHO messages in the ECHO messages in the received ViewChange messages are consistent with data obtained by decrypting signatures corresponding to the ECHO messages, determine that the N−f verified ViewChange messages are received; and construct the NewView message based on the ECHO messages and the signatures in the N−f verified ViewChange messages.

Optionally, in some embodiments, the consensus primary node 420 is configured to obtain corresponding N−f data fragments based on the ECHO messages and the signatures in the N−f verified ViewChange messages; construct the Merkle tree based on the N−f data fragments, and obtain the root hash of the Merkle tree; and construct the NewView message based on the root hash of the Merkle tree, the N−f verified ViewChange messages, and a block number corresponding to the target consensus data.

Optionally, in some embodiments, when receiving the NewView message, the second consensus node 430 is further configured to broadcast the ECHO message for the target consensus data in the consensus network when determining that the present consensus node has an ECHO message including the root hash of the Merkle tree.

Optionally, in some embodiments, when receiving the NewView message, the second consensus node 430 is further configured to: when determining that the present consensus node has the ECHO message corresponding to the target consensus data, construct the ECHO message for the target consensus data based on a target data fragment in the ECHO message corresponding to the target consensus data in the present consensus node, a Merkle tree path of the target data fragment in the Merkle tree, the root hash of the Merkle tree, a view number obtained after view change, and the block number corresponding to the target consensus data; and broadcast the ECHO message for the target consensus data in the consensus network after the view change.

Optionally, in some embodiments, the second consensus node 430 broadcast the ECHO message for the target consensus data in the consensus network after the view change, the system further includes: a fourth consensus node 460, configured to commit the target consensus data to a state machine if the fourth consensus node that receives the ECHO message for the target consensus data receives the ECHO messages of the N−f consensus nodes for the target consensus data.

Optionally, in some embodiments, the first consensus node 410 is any consensus node in the consensus network; and the second consensus node 430 is any consensus node in the consensus network.

The system 400 in a consortium blockchain can implement the methods provided in method embodiments according to FIG. 2 and FIG. 3, with particular reference to the consensus methods in a consortium blockchain of some embodiments shown in FIG. 2 and FIG. 3, and details are omitted.

In conclusion, the previous descriptions are merely preferred embodiments of the present specification, and are not intended to limit the scope of protection of the present specification. Any modification, equivalent substitution, improvement, etc. made within the spirit and principles of one or more embodiments of the present specification shall fall within the scope of the one or more embodiments of the present specification.

The systems, apparatuses, modules, or units illustrated in the previous embodiments can be implemented by using a computer chip or an entity, or can be implemented by using a product having a certain function. A typical implementation is a computer. Specifically, the computer can be a personal computer, a laptop computer, a cellular phone, a camera phone, a smart phone, a personal digital assistant, a media player, a navigation device, an email receiving and sending device, a game console, a tablet computer, a wearable device, or any combination of these devices.

A computer readable medium includes persistent, non-persistent, movable, and unmovable media that can save information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to note that the terms "comprise", "include", or any other variation thereof are intended to cover a non-exclusive inclusion, so that a process, a method, an article, or a device that includes a list of elements includes those elements and further includes other elements not expressly listed or inherent to such a process, method, product, or device. An element proceeded by the phrase "comprise a . . . " does not, without more constraints, preclude the existence of additional identical elements in the process, method, product, or device that includes the element.

The embodiments in the present specification are described in a progressive way. For same or similar parts of the embodiments, references can be made to the embodiments. Each embodiment focuses on a difference from other embodiments. Particularly, the system embodiments are similar to method embodiments, and therefore are described briefly. For a related part, references can be made to some descriptions in the method embodiments.

What is claimed is:

1. A computer-implemented method, comprising:
    in response to determining that a first consensus node in a consensus network of a consortium blockchain does not complete a consensus operation on a target consensus data within a predetermined time period, broadcasting, by the first consensus node, a ViewChange message in the consensus network based on received ECHO messages broadcast for the target consensus data and received signatures, wherein the ECHO messages broadcast for the target consensus data and the signatures are sent by other consensus nodes in the consensus network;

receiving, by a first consensus primary node, the ViewChange message broadcast by the first consensus node, wherein the first consensus primary node is a consensus primary node corresponding to a view existing when the consensus operation is performed on the target consensus data;

in response to determining that N−f verified ViewChange messages are received, constructing, by the first consensus primary node, a NewView message based on the ECHO messages and the signatures in the N−f verified ViewChange messages, and broadcasting, by the first consensus primary node, the NewView message to the consensus network to change a view of the consensus network to a target view, wherein f is a maximum quantity of abnormal consensus nodes allowed in the consensus network, N is a quantity of consensus nodes in the consensus network, and N≥3f+1; and in response to a determination that a present consensus node has an ECHO message corresponding to the target consensus data, broadcasting, by a second consensus node, an ECHO message for the target consensus data in the consensus network, wherein a view number in the ECHO message is a view number of the target view.

2. The method according to claim 1, wherein the method further comprises, before broadcasting, by the first consensus node, the ViewChange message in a consensus network:

splitting, by a second consensus primary node in the consensus network based on a specified erasure coding technology, the target consensus data into a plurality of orderly arranged data fragments that have a same quantity as consensus nodes in the consensus network, wherein the second consensus primary node is a consensus primary node corresponding to a previous view of a view corresponding to the first consensus primary node;

constructing, by the second consensus primary node, a Merkle tree based on the plurality of orderly arranged data fragments; and locally saving, by the second consensus primary node, a data fragment corresponding to the second consensus primary node, a Merkle tree path corresponding to the second consensus primary node, and a root hash of the Merkle tree, and sending, to corresponding consensus nodes in the consensus network, VAL messages comprising other data fragments, corresponding Merkle tree paths, and the root hash of the Merkle tree, wherein one data fragment corresponds to one consensus node in the consensus network.

3. The method according to claim 2, wherein the method further comprises, after locally saving, by the second consensus primary node, the data fragment, and sending, to the corresponding consensus nodes in the consensus network, the VAL messages:

constructing, by a third consensus node that receives a VAL message, an ECHO message for the VAL message received by the third consensus node, and broadcasting the ECHO message constructed by the third consensus node to the consensus network, wherein the ECHO message constructed by the third consensus node comprises a data fragment, a corresponding Merkle tree path, and the root hash of the Merkle tree in the VAL message received by the third consensus node; and constructing, by the second consensus primary node, an ECHO message based on the locally saved data fragment, Merkle tree path corresponding to the second consensus primary node, and the root hash of the Merkle tree, and broadcasting the ECHO message constructed by the second consensus primary node to the consensus network.

4. The method according to claim 3, wherein constructing, by the first consensus primary node, the NewView message based on the ECHO messages and the signatures in N−f verified ViewChange messages comprises:

determining, by the first consensus primary node, whether a hash value of an ECHO message in each of received ViewChange messages is consistent with data obtained by decrypting a signature corresponding to the ECHO message by using a public key;

in response to determining that hash values of N−f ECHO messages in the ECHO messages in the received ViewChange messages are consistent with data obtained by decrypting the signatures corresponding to the ECHO messages, determining, by the first consensus primary node, that the N−f verified ViewChange messages are received; and constructing, by the first consensus primary node, the NewView message based on the ECHO messages and the signatures in the N−f verified ViewChange messages.

5. The method according to claim 4, wherein constructing, by the first consensus primary node, the NewView message based on ECHO messages and the signatures in N−f verified ViewChange messages further comprises:

obtaining, by the first consensus primary node, corresponding N−f data fragments based on the ECHO messages and the signatures in the N−f verified ViewChange messages;

constructing, by the first consensus primary node, the Merkle tree based on the N−f data fragments, and obtaining the root hash of the Merkle tree; and constructing, by the first consensus primary node, the NewView message based on the root hash of the Merkle tree, the N−f verified ViewChange messages, and a block number corresponding to the target consensus data.

6. The method according to claim 5, wherein broadcasting, by the second consensus node, the ECHO message for the target consensus data in the consensus network comprises:

in response to the second consensus node that receives the NewView message determining that the present consensus node has an ECHO message comprising the root hash of the Merkle tree, broadcasting the ECHO message for the target consensus data in the consensus network.

7. The method according to claim 6, wherein broadcasting, by the second consensus node, the ECHO message for the target consensus data in the consensus network comprises:

in response to the second consensus node that receives the NewView message determining that the present consensus node has the ECHO message corresponding to the target consensus data, constructing the ECHO message for the target consensus data based on a target data fragment in the ECHO message corresponding to the target consensus data in the present consensus node, a Merkle tree path of the target data fragment in the Merkle tree, the root hash of the Merkle tree, a view number obtained after a view change, and the block number corresponding to the target consensus data; and broadcasting, by the second consensus node that receives the NewView message, the ECHO message for the target consensus data in the consensus network after the view change.

8. The method according to claim 7, wherein the method further comprises, after broadcasting, by the second consensus node that receives the NewView message, the ECHO message for the target consensus data in the consensus network after the view change, in response to a fourth consensus node receiving ECHO messages of N−f consensus nodes for the target consensus data, committing, by the fourth consensus node that receives the ECHO message for the target consensus data, the target consensus data to a state machine.

9. The method according to claim 1, wherein the first consensus node is any one of consensus nodes in the consensus network, and the second consensus node is any one of the consensus nodes in the consensus network.

10. A non-transitory, computer-readable medium storing one or more instructions executable by a computer system to perform operations comprising:
in response to determining that a first consensus node in a consensus network of a consortium blockchain does not complete a consensus operation on a target consensus data within a predetermined time period, broadcasting, by the first consensus node, a ViewChange message in the consensus network based on received ECHO messages broadcast for the target consensus data and received signatures, wherein the ECHO messages broadcast for the target consensus data and the signatures are sent by other consensus nodes in the consensus network;
receiving, by a first consensus primary node, the ViewChange message broadcast by the first consensus node, wherein the first consensus primary node is a consensus primary node corresponding to a view existing when the consensus operation is performed on the target consensus data;
in response to determining that N−f verified ViewChange messages are received, constructing, by the first consensus primary node, a NewView message based on the ECHO messages and the signatures in the N−f verified ViewChange messages, and broadcasting, by the first consensus primary node, the NewView message to the consensus network to change a view of the consensus network to a target view, wherein f is a maximum quantity of abnormal consensus nodes allowed in the consensus network, N is a quantity of consensus nodes in the consensus network, and N≥3f+1; and
in response to a determination that a present consensus node has an ECHO message corresponding to the target consensus data, broadcasting, by a second consensus node, an ECHO message for the target consensus data in the consensus network, wherein a view number in the ECHO message is a view number of the target view.

11. The non-transitory, computer-readable medium of claim 10, wherein the operations further comprise, before broadcasting, by the first consensus node, the ViewChange message in a consensus network:
splitting, by a second consensus primary node in the consensus network based on a specified erasure coding technology, the target consensus data into a plurality of orderly arranged data fragments that have a same quantity as consensus nodes in the consensus network, wherein the second consensus primary node is a consensus primary node corresponding to a previous view of a view corresponding to the first consensus primary node;
constructing, by the second consensus primary node, a Merkle tree based on the plurality of orderly arranged data fragments; and
locally saving, by the second consensus primary node, a data fragment corresponding to the second consensus primary node, a Merkle tree path corresponding to the second consensus primary node, and a root hash of the Merkle tree, and sending, to corresponding consensus nodes in the consensus network, VAL messages comprising other data fragments, corresponding Merkle tree paths, and the root hash of the Merkle tree, wherein one data fragment corresponds to one consensus node in the consensus network.

12. The non-transitory, computer-readable medium of claim 11, wherein the operations further comprise, after locally saving, by the second consensus primary node, the data fragment, and sending, to the corresponding consensus nodes in the consensus network, the VAL messages:
constructing, by a third consensus node that receives a VAL message, an ECHO message for the VAL message received by the third consensus node, and broadcasting the ECHO message constructed by the third consensus node to the consensus network, wherein the ECHO message constructed by the third consensus node comprises a data fragment, a corresponding Merkle tree path, and the root hash of the Merkle tree in the VAL message received by the third consensus node; and
constructing, by the second consensus primary node, an ECHO message based on the locally saved data fragment, Merkle tree path corresponding to the second consensus primary node, and the root hash of the Merkle tree, and broadcasting the ECHO message constructed by the second consensus primary node to the consensus network.

13. The non-transitory, computer-readable medium of claim 12, wherein constructing, by the first consensus primary node, the NewView message based on the ECHO messages and the signatures in N−f verified ViewChange messages comprises:
determining, by the first consensus primary node, whether a hash value of an ECHO message in each of received ViewChange messages is consistent with data obtained by decrypting a signature corresponding to the ECHO message by using a public key;
in response to determining that hash values of N−f ECHO messages in the ECHO messages in the received ViewChange messages are consistent with data obtained by decrypting the signatures corresponding to the ECHO messages, determining, by the first consensus primary node, that the N−f verified ViewChange messages are received; and
constructing, by the first consensus primary node, the NewView message based on the ECHO messages and the signatures in the N−f verified ViewChange messages.

14. The non-transitory, computer-readable medium of claim 13, wherein constructing, by the first consensus primary node, the NewView message based on ECHO messages and the signatures in N−f verified ViewChange messages further comprises:

obtaining, by the first consensus primary node, corresponding N−f data fragments based on the ECHO messages and the signatures in the N−f verified ViewChange messages;

constructing, by the first consensus primary node, the Merkle tree based on the N−f data fragments, and obtaining the root hash of the Merkle tree; and constructing, by the first consensus primary node, the NewView message based on the root hash of the Merkle tree, the N−f verified ViewChange messages, and a block number corresponding to the target consensus data.

15. The non-transitory, computer-readable medium of claim 14, wherein broadcasting, by the second consensus node, the ECHO message for the target consensus data in the consensus network comprises:

in response to the second consensus node that receives the NewView message determining that the present consensus node has an ECHO message comprising the root hash of the Merkle tree, broadcasting the ECHO message for the target consensus data in the consensus network.

16. The non-transitory, computer-readable medium of claim 15, wherein broadcasting, by the second consensus node, the ECHO message for the target consensus data in the consensus network comprises:

in response to the second consensus node that receives the NewView message determining that the present consensus node has the ECHO message corresponding to the target consensus data, constructing the ECHO message for the target consensus data based on a target data fragment in the ECHO message corresponding to the target consensus data in the present consensus node, a Merkle tree path of the target data fragment in the Merkle tree, the root hash of the Merkle tree, a view number obtained after a view change, and the block number corresponding to the target consensus data; and broadcasting, by the second consensus node that receives the NewView message, the ECHO message for the target consensus data in the consensus network after the view change.

17. The non-transitory, computer-readable medium of claim 16, wherein the operations further comprise, after broadcasting, by the second consensus node that receives the NewView message, the ECHO message for the target consensus data in the consensus network after the view change, in response to a fourth consensus node receiving ECHO messages of N−f consensus nodes for the target consensus data, committing, by the fourth consensus node that receives the ECHO message for the target consensus data, the target consensus data to a state machine.

18. The non-transitory, computer-readable medium of claim 10, wherein the first consensus node is any one of consensus nodes in the consensus network, and the second consensus node is any one of the consensus nodes in the consensus network.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

in response to determining that a first consensus node in a consensus network of a consortium blockchain does not complete a consensus operation on a target consensus data within a predetermined time period, broadcasting, by the first consensus node, a ViewChange message in the consensus network based on received ECHO messages broadcast for the target consensus data and received signatures, wherein the ECHO messages broadcast for the target consensus data and the signatures are sent by other consensus nodes in the consensus network;

receiving, by a first consensus primary node, the ViewChange message broadcast by the first consensus node, wherein the first consensus primary node is a consensus primary node corresponding to a view existing when the consensus operation is performed on the target consensus data;

in response to determining that N−f verified ViewChange messages are received, constructing, by the first consensus primary node, a NewView message based on the ECHO messages and the signatures in the N−f verified ViewChange messages, and broadcasting, by the first consensus primary node, the NewView message to the consensus network to change a view of the consensus network to a target view, wherein f is a maximum quantity of abnormal consensus nodes allowed in the consensus network, N is a quantity of consensus nodes in the consensus network, and N≥3f+1; and in response to a determination that a present consensus node has an ECHO message corresponding to the target consensus data, broadcasting, by a second consensus node, an ECHO message for the target consensus data in the consensus network, wherein a view number in the ECHO message is a view number of the target view.

20. The system of claim 19, wherein the operations further comprise, before broadcasting, by the first consensus node, the ViewChange message in a consensus network:

splitting, by a second consensus primary node in the consensus network based on a specified erasure coding technology, the target consensus data into a plurality of orderly arranged data fragments that have a same quantity as consensus nodes in the consensus network, wherein the second consensus primary node is a consensus primary node corresponding to a previous view of a view corresponding to the first consensus primary node;

constructing, by the second consensus primary node, a Merkle tree based on the plurality of orderly arranged data fragments; and locally saving, by the second consensus primary node, a data fragment corresponding to the second consensus primary node, a Merkle tree path corresponding to the second consensus primary node, and a root hash of the Merkle tree, and sending, to corresponding consensus nodes in the consensus network, VAL messages comprising other data fragments, corresponding Merkle tree paths, and the root hash of the Merkle tree, wherein one data fragment corresponds to one consensus node in the consensus network.

* * * * *